(12) United States Patent
Park et al.

(10) Patent No.: US 12,498,145 B2
(45) Date of Patent: Dec. 16, 2025

(54) THERMAL MANAGEMENT SYSTEM OF VEHICLE

(71) Applicants: Hyundai Motor Company, Seoul (KR); Kia Corporation, Seoul (KR); Doowon Heavy Industrial Co., Ltd., Sacheon-si (KR); TNE Korea Co., Ltd., Cheongju-si (KR)

(72) Inventors: Man Hee Park, Suwon-si (KR); Hochan An, Hwaseong-si (KR); Wan Je Cho, Hwaseong-si (KR); Yeonho Kim, Seoul (KR); Jeawan Kim, Hwaseong-si (KR); Hoyoung Jeong, Daegu (KR); Yeong Jun Kim, Incheon (KR); Jae Yeon Kim, Hwaseong-si (KR); Gwi Taek Kim, Cheonan-si (KR); Ki Cheol Park, Sejong-si (KR); Kyeong Su Kim, Daejeon (KR); Tea Jin Lee, Pyeongtaek-si (KR)

(73) Assignees: HYUNDAI MOTOR COMPANY, Seoul (KR); KIA CORPORATION, Seoul (KR); DOOWON HEAVY INDUSTRIAL CO., LTD., Sacheon-si (KR); TNE KOREA CO., LTD., Cheongju-si (KR)

( * ) Notice: Subject to any disclaimer, the term of this patent is extended or adjusted under 35 U.S.C. 154(b) by 252 days.

(21) Appl. No.: 18/305,670

(22) Filed: Apr. 24, 2023

(65) Prior Publication Data
US 2024/0191911 A1  Jun. 13, 2024

(30) Foreign Application Priority Data

Dec. 13, 2022 (KR) .......... 10-2022-0173326

(51) Int. Cl.
*F25B 9/00* (2006.01)
*B60H 1/00* (2006.01)
(Continued)

(52) U.S. Cl.
CPC ......... *F25B 9/004* (2013.01); *B60H 1/00328* (2013.01); *B60H 1/3204* (2013.01);
(Continued)

(58) Field of Classification Search
CPC ........... F25B 9/004; F25B 9/06; F24F 5/0085; B64D 2013/0688; B60H 1/32; B60H 1/3204; B60H 2001/3297
See application file for complete search history.

(56) References Cited

U.S. PATENT DOCUMENTS

2,622,406 A * 12/1952 Scofield ................. B64D 13/06
62/331
4,015,438 A * 4/1977 Kinsell ................... F25B 9/004
62/88
(Continued)

*Primary Examiner* — Christopher R Zerphey
(74) *Attorney, Agent, or Firm* — SLATER MATSIL, LLP (57) ABSTRACT

An embodiment thermal management system of a vehicle includes an air supply device that draws and supplies ambient air. An air cycle apparatus connected to the air supply device that compresses or expands the air to be changed to a high or low temperature air. An air distribution device is connected to the air cycle apparatus and a cabin room connected to the air distribution device that receives the high or low temperature air. A first heat-exchanger connected to the air cycle apparatus performs heat-exchange on the high temperature air and a second heat-exchanger connected to the first heat-exchanger and the air cycle apparatus performs heat-exchange on the air. The second heat-exchanger and the air distribution device are selectively connected and the air having heat-exchanged while passing through the second heat-exchanger is selectively supplied to the air distribution device.

12 Claims, 5 Drawing Sheets

(51) Int. Cl.
 *B60H 1/32* (2006.01)
 *F25B 9/06* (2006.01)
 *F25B 11/02* (2006.01)

(52) U.S. Cl.
 CPC ............... *F25B 9/06* (2013.01); *F25B 11/02* (2013.01); *B60H 2001/3297* (2013.01)

(56) References Cited

U.S. PATENT DOCUMENTS

| | | | | |
|---|---|---|---|---|
| 4,262,495 | A * | 4/1981 | Gupta | B64D 13/06 62/89 |
| 5,086,622 | A * | 2/1992 | Warner | B64D 13/06 62/88 |
| 5,628,203 | A * | 5/1997 | Adolph | F24F 5/0085 62/401 |
| 6,041,615 | A * | 3/2000 | Ostersetzer | F25B 9/004 62/88 |
| 6,539,744 | B1 * | 4/2003 | Piao | F24F 5/0085 62/402 |
| 6,672,081 | B1 * | 1/2004 | Albaroudi | B64D 13/06 62/172 |
| 8,225,619 | B2 * | 7/2012 | Okuda | F25B 9/004 62/93 |
| 8,365,550 | B2 * | 2/2013 | Vogel | B64D 13/06 62/401 |
| 9,464,638 | B2 * | 10/2016 | Cepeda-Rizo | F25B 9/004 |
| 11,148,813 | B2 * | 10/2021 | Shea | B64D 13/06 |
| 12,054,265 | B2 * | 8/2024 | Vignali | B64D 13/06 |
| 2004/0089000 | A1 * | 5/2004 | Christen | B60H 1/32 62/402 |
| 2017/0241340 | A1 * | 8/2017 | Feulner | F02C 7/185 |
| 2023/0288102 | A1 * | 9/2023 | Vignali | B60H 1/3204 |
| 2024/0182175 | A1 * | 6/2024 | Vignali | B64D 13/06 |

\* cited by examiner

THERMAL MANAGEMENT SYSTEM OF VEHICLE

CROSS-REFERENCE TO RELATED APPLICATIONS

This application claims the benefit of Korean Patent Application No. 10-2022-0173326, filed on Dec. 13, 2022, which application is hereby incorporated herein by reference.

TECHNICAL FIELD

The present disclosure relates to a thermal management system of a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

On the other hand, an environment-friendly technology of a vehicle is a core technology of a future automobile industry, and advanced car makers have focused their energy on the development of an environmentally friendly vehicle to achieve environmental and fuel efficiency regulations.

That is, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

The electric vehicle is in the spotlight as a means of transportation in the future to solve environment problems and energy resource problems.

An air conditioner apparatus for controlling the vehicle interior temperature is also applied to such an electric vehicle. Since the refrigerant used in the air conditioner apparatus belongs to environmental regulated substances, a system that may control the vehicle interior temperature by using a natural refrigerant is required.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a thermal management system of a vehicle. Particular embodiments relate to a thermal management system of a vehicle configured to perform cooling or heating of a vehicle interior by using ambient air.

Embodiments of the present disclosure provide a thermal management system of a vehicle that is environmentally friendly and capable of responding to environmental regulations by performing cooling or heating of a vehicle interior by using an ambient air.

A thermal management system of a vehicle may include an air supply device configured to draw and supply ambient air, an air cycle apparatus connected to the air supply device through a first line and configured to compress or expand air supplied from the air supply device to be changed to a high temperature air or a low temperature air, an air distribution device connected to the air cycle apparatus through a second line, a cabin room connected to the air distribution device through the second line and supplied with the high temperature air or the low temperature air supplied from the air distribution device through the second line, a first heat-exchanger connected to the air cycle apparatus through a first connection line and configured to perform heat-exchange on the compressed high temperature air supplied from the air cycle apparatus, a second heat-exchanger connected to the first heat-exchanger through the first connection line, connected to the air cycle apparatus through a second connection line, and configured to perform heat-exchange on air introduced through the first connection line, and a third line configured to selectively connect the second heat-exchanger and the air distribution device and selectively supply air having heat-exchanged while passing through the second heat-exchanger to the air distribution device.

The air cycle apparatus may include a compressing part configured to compress the air supplied from the air supply device through the first line and to supply the high temperature air to the first heat-exchanger through the first connection line, an expansion part configured to expand air supplied from the second heat-exchanger through the second connection line and to supply the expanded low temperature air to the air distribution device through the second line, a driving portion provided between the compressing part and the expansion part and configured to provide driving torque to the compressing part and the expansion part, and a controller configured to control operation of the driving portion.

The compressing part may include a compressor, the expansion part may include a turbine, and the driving portion may include a motor.

A thermal management system may further include a first valve provided on the first connection line between the air cycle apparatus and the first heat-exchanger and a second valve provided on the first connection line between the first heat-exchanger and the second heat-exchanger.

A thermal management system may further include a first bypass line interconnecting the first valve and the second valve such that air flowing into the first connection line from the air cycle apparatus may be supplied to the second heat-exchanger by detouring around the first heat-exchanger and a second bypass line interconnecting the second valve and the second connection line between the second heat-exchanger and the air cycle apparatus.

A pressure adjuster may be provided on the first connection line between the air cycle apparatus and the first valve.

A third valve may be provided on the second connection line.

A third bypass line may be connected to the third valve such that air introduced through the second connection line may detour around the second line.

A first end of the third bypass line may be connected to the third valve and a second end of the third bypass line is connected to the second line between the air cycle apparatus and the air distribution device.

An expansion valve may be provided on the third bypass line such that air flowing into the third bypass line may be selectively expanded.

A dehumidifier may be provided on the second line between the air cycle apparatus and the air distribution device to remove moisture included in air flowing along the second line.

A control valve may be provided between the dehumidifier and the air distribution device to supply air having passed through the dehumidifier to the air distribution device or externally discharge air having passed through the dehumidifier.

A temperature sensor may be provided on the dehumidifier.

A thermal management system may further include a fourth valve provided on the second line at a rear end of the cabin room with reference to an air flow direction.

A thermal management system may further include a first recirculation line connecting the fourth valve to the air supply device by passing through the second heat-exchanger and a second recirculation line of which a first end is connected to the fourth valve and a second end is connected to the air supply device such that air discharged from the cabin room is recirculated to the air supply device.

The second heat-exchanger may be an air-cooled heat-exchanger configured to cool the high temperature air introduced through the first connection line by heat-exchange with the ambient air or air introduced through the first recirculation line.

A check valve may be provided on the third line to prevent air from flowing from the air distribution device to the second heat-exchanger.

A thermal management system may further include a coolant line configured to circulate the coolant and a cooling apparatus including a radiator and a water pump provided on the coolant line.

The first heat-exchanger may be connected to the cooling apparatus through the coolant line to be selectively supplied with the coolant from the cooling apparatus.

The first heat-exchanger may be a water-cooled heat-exchanger.

A thermal management system of a vehicle according to an embodiment may become environmentally friendly and may respond to future environmental regulations by performing cooling or heating of the vehicle interior by using the ambient air.

In addition, since the conventionally used refrigerant is removed, the refrigerant injection process may be removed and at the same time, the refrigerant injection equipment becomes unnecessary, and therefore, reduction in the number of manufacturing processes, reduction of overall manufacturing cost, and improvement of productivity may be achieved.

Furthermore, by applying a low-pressure system using the ambient air, quality problems with respect to micro-leaks may be prevented and maintenance costs may be reduced.

The following reference identifiers may be used in connection with the accompanying drawings to describe exemplary embodiments of the present disclosure.

20: air supply device
22: first line
24: second line
30: air distribution device
40: cabin room
50: dehumidifier
52: temperature sensor
60: control valve
70: first heat-exchanger
80: second heat-exchanger
82: third line
84: check valve
92: first recirculation line
94: second recirculation line
112: first connection line
113: pressure adjuster
114: first bypass line
116: second bypass line
122: second connection line
124: third bypass line
126: expansion valve
200: cooling apparatus
202: coolant line
204: radiator
206: water pump
208: reservoir tank
V1, V2, V3, V4: first, second, third, and fourth valves

DETAILED DESCRIPTION OF ILLUSTRATIVE EMBODIMENTS

Exemplary embodiments of the present invention will hereinafter be described in detail with reference to the accompanying drawings.

Exemplary embodiments disclosed in the present specification and the constructions depicted in the drawings are only the preferred embodiments of the present disclosure and do not cover the entire scope of the present disclosure. Therefore, it will be understood that there may be various equivalents and variations at the time of the application of this specification.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit," " . . . means," " . . . portions," " . . . part," and " . . . member" described in the specification, mean a unit of a comprehensive element that performs at least one function or operation.

Figure 1:
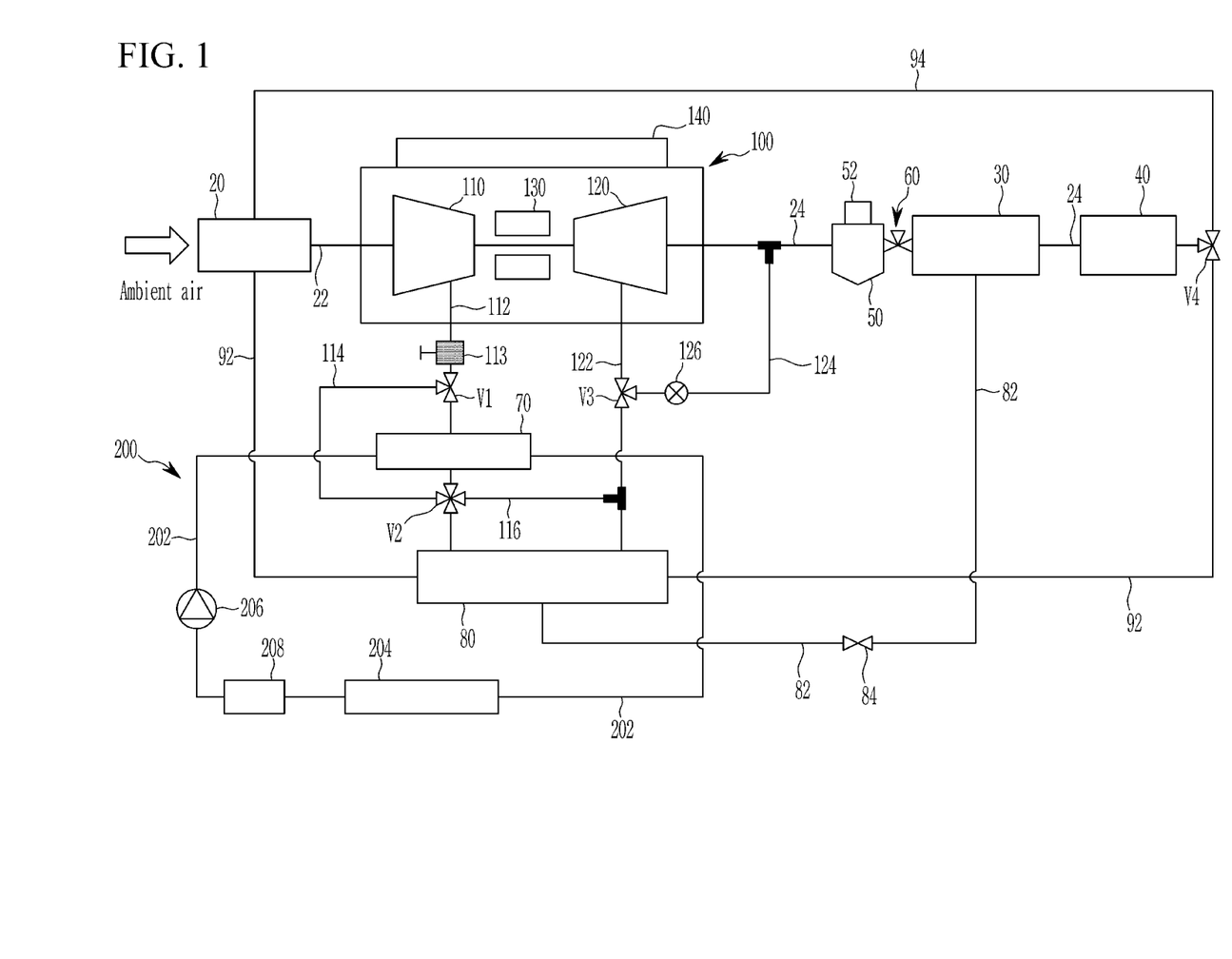
FIG. 1 is a block diagram of a thermal management system of a vehicle according to an embodiment.

FIG. 1 is a block diagram of a thermal management system of a vehicle according to an embodiment.

A thermal management system of a vehicle according to an embodiment may perform cooling or heating of a vehicle interior by using ambient air.

Such a thermal management system may be applied to a hybrid vehicle or an electric vehicle. Referring to FIG. 1, the thermal management system may include an air supply device 20, an air cycle apparatus 100, an air distribution device 30, a cabin room 40, a first heat-exchanger 70, a second heat-exchanger 80, and a third line 82.

Here, the air supply device 20 may be connected to the air cycle apparatus 100 through a first line 22 flowing air. In addition, the air distribution device 30 and the cabin room 40 may be connected to the air cycle apparatus 100 through a second line 24 flowing air.

In the present embodiment, the air supply device 20 may draw and supply the ambient air.

The air supply device 20 may be provided with, for example, an air filter configured to remove impurities included in the drawn ambient air, a muffler configured to reduce noise generated from an internal flowing of the ambient air, a flap door configured to control flow of the ambient air, and the like.

The air cycle apparatus 100 may be connected to the air supply device 20 through the first line 22. The air cycle apparatus 100 may compress or expand the air supplied from the air supply device 20 through the first line 22 to form a high temperature air or a low temperature air Here, the air cycle apparatus 100 may include a compressing part 110, an expansion part 120, a driving portion 130, and a controller 140.

First, the compressing part 110 may compress the air supplied from the air supply device 20 through the first line 22. Here, the compressing part 110 may compress air to form a state of high temperature and high pressure. The compressing part 110 may include a compressor.

Accordingly, the compressing part 110 may supply a compressed high temperature air through the first heat-exchanger 70 through a first connection line 112.

The expansion part 120 may expand the air supplied from the second heat-exchanger 80 through a second connection line 122. Here, the expansion part 120 may expand the air to form a state of low temperature and low pressure. The expansion part 120 may include a turbine.

Accordingly, the expansion part 120 may supply the expanded low temperature air to the air distribution device 30 through the second line 24.

In the present embodiment, the driving portion 130 may be provided between the compressing part 110 and the expansion part 120. Here, the driving portion 130 may provide driving torque to the compressing part 110 and the expansion part 120. The driving portion 130 may include a motor.

In addition, the controller 140 is electrically connected to the driving portion 130 and may control the operation of the driving portion 130.

In the present embodiment, the air distribution device 30 may be connected to the air cycle apparatus 100 through the second line 24.

The air distribution device 30 may distribute the introduced air. Here, the air distribution device 30 may be provided with, for example, a muffler configured to reduce noise generated from an internal flowing of the ambient air, a flap door configured to control flow of the ambient air, and the like.

The cabin room 40 means a vehicle interior space and may be connected to the air distribution device 30 through the second line 24.

The cabin room 40 may be heated or cooled by the high temperature air or the low temperature air supplied from the air distribution device 30 through the second line 24.

Here, a dehumidifier 50 may be provided on the second line 24 between the air cycle apparatus 100 and the air distribution device 30 to remove moisture included in the air flowing along the second line 24.

The dehumidifier 50 may remove moisture included in the air and discharge the air with the moisture removed.

Meanwhile, a temperature sensor 52 is provided on the dehumidifier 50. The temperature sensor 52 is configured to detect a temperature of the air introduced to the dehumidifier 50.

In addition, a control valve 60 may be provided between the dehumidifier 50 and the air distribution device 30 to supply the air having passed through the dehumidifier 50 to the air distribution device 30 or discharge it to the outside.

That is, when heating of the vehicle interior is required, the control valve 60 may externally discharge a low temperature air having passed through the dehumidifier 50.

To the contrary, when cooling of the vehicle interior is required, the control valve 60 may supply the low temperature air having passed through the dehumidifier 50 to the air distribution device 30.

In the present embodiment, the first heat-exchanger 70 may be connected to the air cycle apparatus 100 through the first connection line 112 and perform heat-exchange on the compressed high temperature air supplied from the air cycle apparatus 100.

Meanwhile, the thermal management system may further include a coolant line 202 configured to circulate the coolant and a cooling apparatus 200 including a radiator 204 and a water pump 206 provided on the coolant line 202.

The radiator 204 is disposed in the front of the vehicle, and a cooling fan (not shown) may be provided to the rear. The radiator 204 may cool the coolant through an operation of the cooling fan and heat-exchange with the ambient air.

In addition, a reservoir tank 208 may be provided on the coolant line between the radiator 204 and the water pump 206. The reservoir tank 208 may store the coolant cooled at the radiator 204.

The cooling apparatus 200 may circulate the coolant cooled at the radiator 204 along the coolant line 202 by an operation of the water pump 206.

Here, the first heat-exchanger 70 may be connected to the cooling apparatus 200 through the coolant line 202 to be selectively supplied with the coolant from the cooling apparatus 200.

In more detail, the first heat-exchanger 70 is provided on the coolant line 202 such that the coolant cooled at the radiator 204 may pass through.

That is, the first heat-exchanger 70 may be a water-cooled heat-exchanger through which the coolant may flow.

In addition, the second heat-exchanger 80 may be connected to the first heat-exchanger 70 through the first connection line 112 and may be connected to the air cycle apparatus 100 through the second connection line 122. The second heat-exchanger 80 may perform heat-exchange on the air introduced through the first connection line 112.

In the present embodiment, the third line 82 may selectively connect the second heat-exchanger 80 and the air distribution device 30 and may selectively supply the air having heat-exchanged while passing through the second heat-exchanger 80 to the air distribution device 30.

That is, when heating the vehicle interior, the third line 82 may supply the high temperature air having passed through the second heat-exchanger 80 to the air distribution device 30.

A check valve 84 may be provided on the third line 82 to prevent air from flowing from the air distribution device 30 to the second heat-exchanger 80.

The check valve 84 may prevent the air from the air distribution device 30 from flowing backward along the third line 82 and entering the second heat-exchanger 80. The check valve 84 may be a one-way valve.

In the present embodiment, the thermal management system may further include a first valve V1, a second valve V2, a third valve V3, and a fourth valve V4.

First, the first valve V1 may be provided on the first connection line 112 between the air cycle apparatus 100 and the first heat-exchanger 70.

Here, a pressure adjuster 113 may be provided on the first connection line 112 between the air cycle apparatus 100 and the first valve V1.

The pressure adjuster 113 is a device for maintaining a constant outlet pressure in situations where the pressure of the air supplied from the air cycle apparatus 100 varies.

That is, the pressure adjuster 113 may constantly maintain the pressure of the air discharged through the first connection line 112 toward the first valve V1 regardless of the pressure of the air supplied from the air cycle apparatus 100.

In addition, the second valve V2 may be provided on the first connection line 112 between the first heat-exchanger 70 and the second heat-exchanger 80.

Here, the thermal management system may include a first bypass line 114 and a second bypass line 116.

In the present embodiment, the first bypass line 114 may interconnect the first valve V1 and the second valve V2 such that the air flowing into the first connection line 112 from the air cycle apparatus 100 may be supplied to the second heat-exchanger 80 by detouring around the first heat-exchanger 70.

Here, a first end of the first bypass line 114 may be connected to the first valve V1, and a second end of the first bypass line 114 may be connected to the second valve V2.

When opened by an operation of the first valve V1, the first bypass line 114 may directly flow the high temperature air supplied from the air cycle apparatus 100 to the second heat-exchanger 80 without passing through the first heat-exchanger 70.

In the present embodiment, the second bypass line 116 may interconnect the second valve V2 and the second connection line 122 between the second heat-exchanger 80 and the air cycle apparatus 100.

Here, a first end of the second bypass line 116 may be connected to the second valve V2, and a second end of the second bypass line 116 may be connected to the second connection line 122.

By an operation of the second valve V2, the second bypass line 114 may directly flow the high temperature air supplied from the air cycle apparatus 100 to the second connection line 122 without passing through the second heat-exchanger 80.

Meanwhile, in the present embodiment, the third valve V3 may be provided on the second connection line 122 between the second heat-exchanger 80 and the air cycle apparatus 100.

In more detail, the third valve V3 may be positioned between a location where the second bypass line 116 is connected to the second connection line 122 and the air cycle apparatus 100.

Here, a third bypass line 124 may be connected to the third valve V3 such that the air introduced through the second connection line 122 may detour around the second line 24.

A first end of the third bypass line 124 may be connected to the third valve V3. A second end of the third bypass line 124 may be connected to the second line 24 between the air cycle apparatus 100 and the air distribution device 30.

In more detail, a second end of the third bypass line 124 is connected to the second line 24 between the air cycle apparatus 100 and the dehumidifier 50.

Here, an expansion valve 126 may be provided on the third bypass line 124 such that the air flowing into the third bypass line 124 may be selectively expanded.

The expansion valve 126 may expand the air such that the air flowing into the third bypass line 124 without passing through the expansion part 120 may be changed to the low temperature state.

In addition, the fourth valve V4 may be provided on the second line 24 at a rear end of the cabin room 40 with reference to an air flow direction.

Here, the thermal management system may further include a first recirculation line 92 and a second recirculation line 94.

First, the first recirculation line 92 may connect the fourth valve V4 to the air supply device 20 by passing through the second heat-exchanger 80.

The first recirculation line 92 may supply the air having passed through the cabin room 40 to the second heat-exchanger 80 or supply the ambient air drawn at the air supply device 20 to the second heat-exchanger 80.

Here, the second heat-exchanger 80 may be an air-cooled heat-exchanger configured to cool a high temperature air introduced through the first connection line 112 by heat-exchange with the ambient air or air received through the first recirculation line 92.

When cooling of the vehicle interior is required, the first recirculation line 92 may be selectively opened by an operation of the fourth valve V4.

In addition, when heating of the vehicle interior is required, a partial portion of the first recirculation line 92 may be opened connecting the fourth valve V4 and the second heat-exchanger 80 by the operation of the fourth valve V4.

At this time, a remaining portion of the first recirculation line 92 that connects the air supply device 20 and the second heat-exchanger 80 may be closed.

To the contrary, when heating of the vehicle interior is required, the first recirculation line 92 may be closed at a portion connecting the fourth valve V4 and the second heat-exchanger 80 by the operation of the fourth valve V4.

At this time, the remaining portion of the first recirculation line 92 that connects the air supply device 20 and the second heat-exchanger 80 may be opened.

In addition, the second recirculation line 94 may recirculate the air discharged from the cabin room 40 to the air supply device 20.

In the present embodiment, a first end of the second recirculation line 94 may be connected to the fourth valve V4. A second end of the second recirculation line 94 may be connected to the air supply device 20.

When heating of the vehicle interior is required, the second recirculation line 94 may be always opened by the operation of the fourth valve V4.

To the contrary, when cooling of the vehicle interior is required, the second recirculation line 94 may be selectively opened by the operation of the fourth valve V4.

Meanwhile, in the present embodiment, a cooling mode of the vehicle interior may be divided into a first cooling mode and a second cooling mode.

The first cooling mode and the second cooling mode may be distinguished by a difference in operating load of the system according to the vehicle interior temperature.

In more detail, when cooling the vehicle interior, the load of the thermal management system may increase until a preset target temperature is reached. On the other hand, the load of the thermal management system may be reduced after reaching the preset target temperature during cooling of the vehicle interior.

Here, in the first cooling mode, both the first heat-exchanger 70 and the second heat-exchanger 80 may be operated. In addition, in the second cooling mode, only the first heat-exchanger 70 may be operated.

In addition, the heating mode of the vehicle interior may be divided into a first heating mode and a second heating mode.

Similar to the above-described cooling mode, the first heating mode and the second heating mode may be distinguished by a difference in operating load of the system according to the vehicle interior temperature.

In more detail, when heating the vehicle interior, the load of the thermal management system may increase until a preset target temperature is reached. On the other hand, the load of the thermal management system may be reduced after reaching the preset target temperature during heating of the vehicle interior.

That is, when the load is large, the thermal management system is operated in the first cooling mode or the first heating mode, and when the load is low, the system may be operated in the second cooling mode or the second heating mode.

Hereinafter, operation and action of a thermal management system of a vehicle according to an embodiment configured as described above is described in detail with reference to FIG. 2 to FIG. 5.

First, the operation in the first cooling mode of the vehicle interior is described with reference to FIG. 2.

Figure 2:
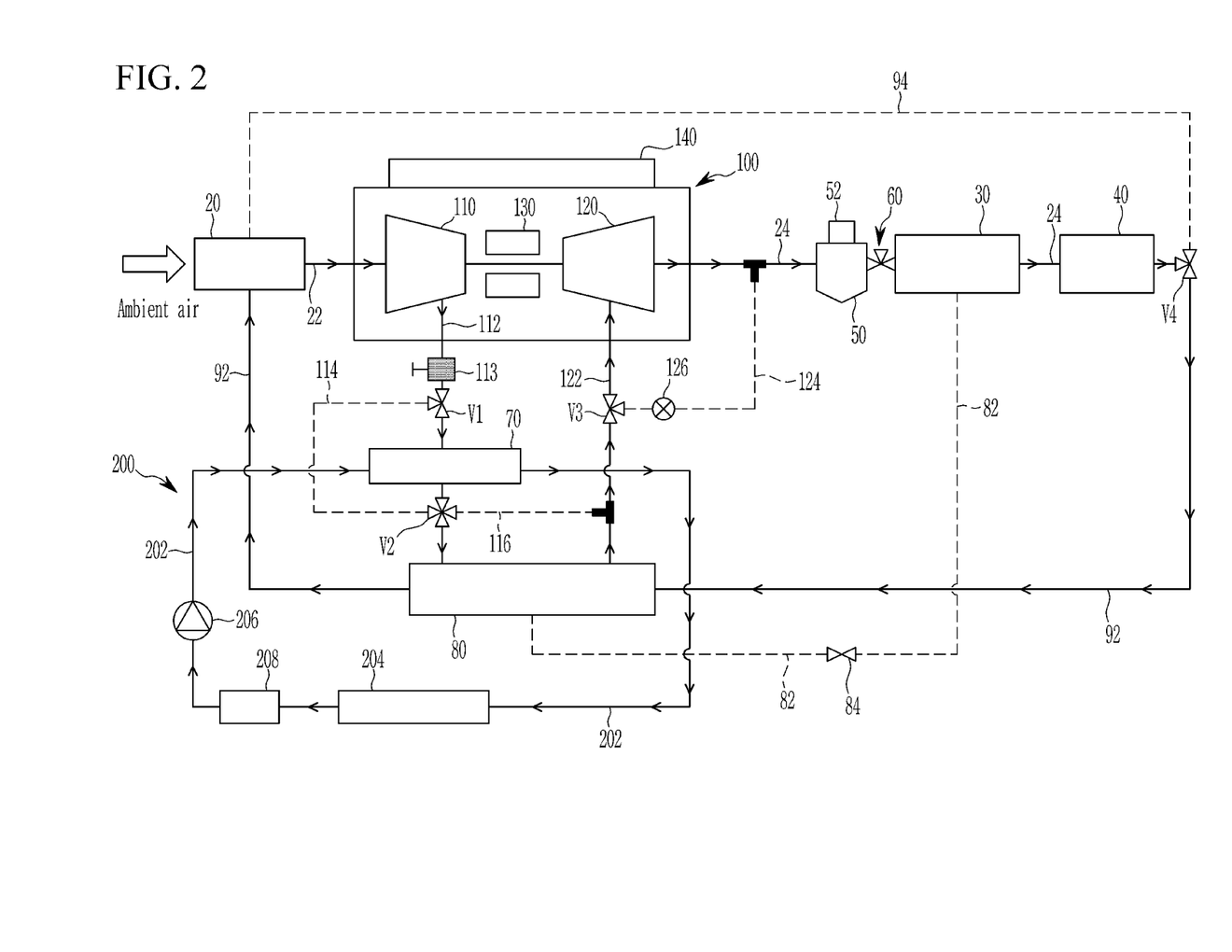
FIG. 2 is an operation diagram of a first cooling mode of a thermal management system of a vehicle according to an embodiment.

FIG. 2 is an operation diagram of the first cooling mode of a thermal management system of a vehicle according to an embodiment.

Referring to FIG. 2, the air supply device 20 draws the ambient air and supplies the drawn air to the compressing part 110 of the air cycle apparatus 100 through the first line 22.

The compressing part 110 may compress the air supplied from the air supply device 20 by the operation of the driving portion 130 to form the high temperature state.

Here, the first bypass line 114 and the second bypass line 116 may be closed by the operation of the first valve V1 and the second valve V2. At the same time, the third bypass line 124 may be closed by an operation of the third valve V3.

Accordingly, a high temperature air compressed at the compressing part 110 flows into the first heat-exchanger 70 along the first connection line 112.

Here, the cooling apparatus 200 may circulate the coolant to the coolant line 202 by the operation of the water pump 206 such that the coolant may be supplied to the first heat-exchanger 70.

Then, the high temperature air introduced into the first heat-exchanger 70 may be cooled through heat-exchange with the coolant supplied from the cooling apparatus 200.

Then, the air discharged from the first heat-exchanger 70 flows into the second heat-exchanger 80 along the first connection line 112.

Here, the first recirculation line 92 may be opened by the operation of the fourth valve V4. On the other hand, the second recirculation line 94 may be closed by the operation of the fourth valve V4.

Accordingly, the air discharged from the cabin room 40 may flow into the second heat-exchanger 80 along the opened first recirculation line 92.

Here, the second heat-exchanger 80 may cool the air supplied from the first heat-exchanger 70 through heat-exchange with the air introduced through the first recirculation line 92.

The air cooled at the second heat-exchanger 80 is supplied to the expansion part 120 along the second connection line 122. The expansion part 120 expands the supplied air by the operation of the driving portion 130 to form the low temperature state.

A low temperature air expanded at the expansion part 120 may pass through the dehumidifier 50 along the second line 24. Here, the dehumidifier 50 may remove the moisture included in the air and supply the air having the moisture removed to the control valve 60.

The control valve 60 supplies the low temperature air supplied from the dehumidifier 50 to the air distribution device 30. The air distribution device 30 distributes the supplied low temperature air and supplies it to the cabin room 40 through the second line 24.

Accordingly, the cabin room 40 may be cooled by the low temperature air supplied from the air distribution device 30.

Then, the air flowing from the cabin room 40 to the fourth valve V4 through the second line 24 may pass through the second heat-exchanger 80 along the opened first recirculation line 92 and then may flow into the air supply device 20.

While repetitively performing the operations, the cabin room 40 may be smoothly cooled in the first cooling mode by using the ambient air. While performing these operations repeatedly, the cabin room 40 may be smoothly cooled using outside air in the first cooling mode.

That is, in the first cooling mode, since the temperature of the cabin room 40 has not reached the target temperature, the thermal management system may simultaneously operate the first heat-exchanger 70 and the second heat-exchanger 80 such that the temperature of the air supplied to the expansion part 120 may be rapidly lowered.

Accordingly, in the first cooling mode, the temperature of the cabin room 40 may reach the target temperature by improving operation efficiency of the expansion part 120.

In the present embodiment, the operation in the second cooling mode of the vehicle interior is described with reference to FIG. 3.

Figure 3:
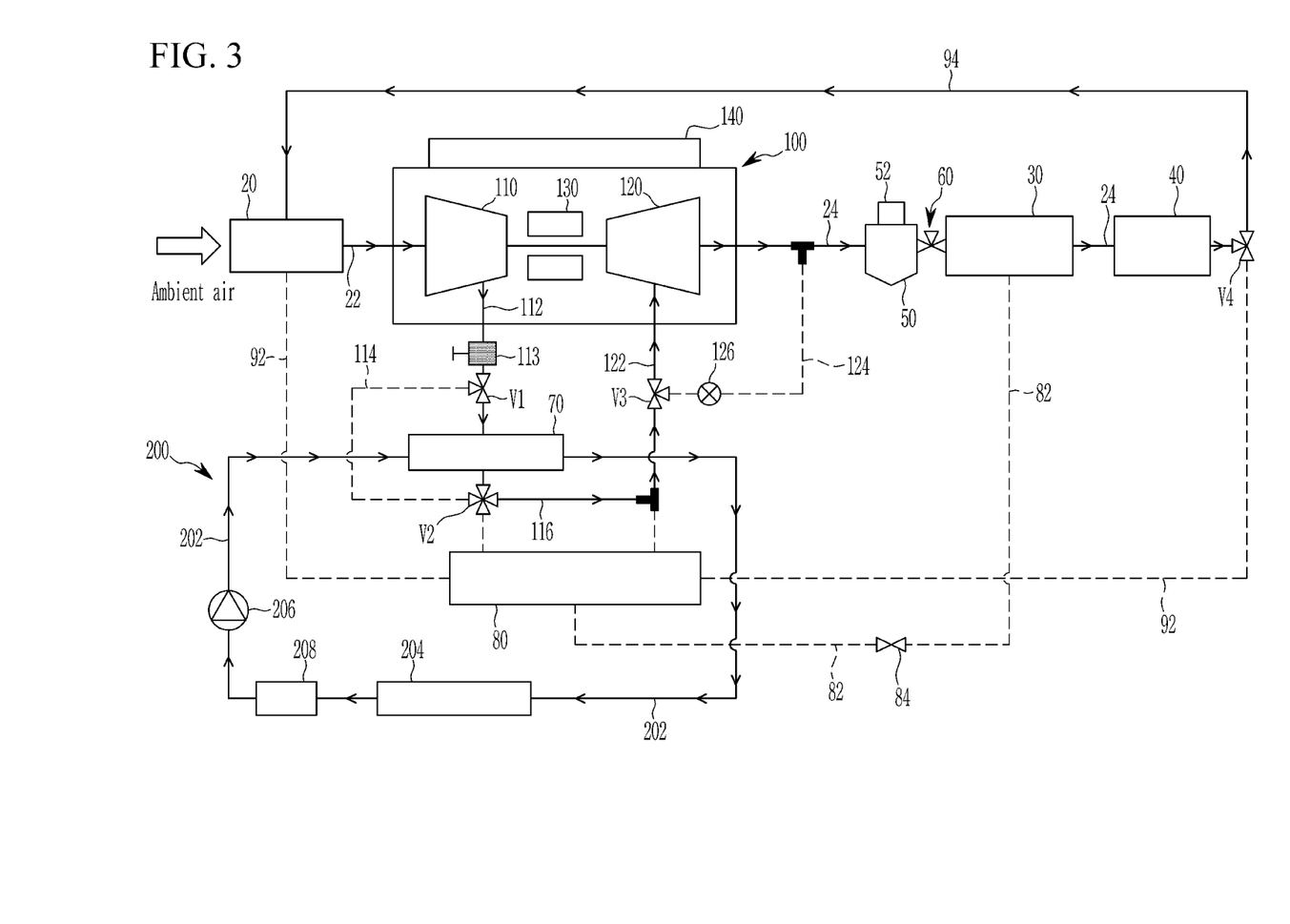
FIG. 3 is an operation diagram of a second cooling mode of a thermal management system of a vehicle according to an embodiment.

FIG. 3 is an operation diagram of the second cooling mode of a thermal management system of a vehicle according to an embodiment.

Referring to FIG. 3, the air supply device 20 draws the ambient air and supplies the drawn air to the compressing part 110 of the air cycle apparatus 100 through the first line 22.

The compressing part 110 may compress the air supplied from the air supply device 20 by the operation of the driving portion 130 to form the high temperature state.

Here, the first bypass line 114 may be closed by the operation of the first valve V1 and the second valve V2.

In addition, the second bypass line 116 may be opened by the operation of the second valve V2.

At this time, the second valve V2 may close a portion of the first connection line 112 connecting the second valve V2 and the second heat-exchanger 80.

In addition, the third bypass line 124 may be closed by the operation of the third valve V3.

Accordingly, the high temperature air compressed at the compressing part 110 flows into the first heat-exchanger 70 along the first connection line 112.

Here, the cooling apparatus 200 may circulate the coolant to the coolant line 202 by the operation of the water pump 206 such that the coolant may be supplied to the first heat-exchanger 70.

Then, the high temperature air introduced into the first heat-exchanger 70 may be cooled through heat-exchange with the coolant supplied from the cooling apparatus 200.

Then, the air discharged from the first heat-exchanger 70 flows to the opened second bypass line 116 by the operation of the second valve V2.

The air introduced into the second bypass line 116 is supplied to the expansion part 120 along the opened second connection line 122 by the operation of the third valve V3. The expansion part 120 expands the supplied air by the operation of the driving portion 130 to form the low temperature state.

The low temperature air expanded at the expansion part 120 may pass through the dehumidifier 50 along the second line 24. Here, the dehumidifier 50 may remove the moisture included in the air, and supply the air with the moisture removed to the control valve 60.

The control valve 60 supplies the low temperature air supplied from the dehumidifier 50 to the air distribution device 30. The air distribution device 30 distributes the supplied low temperature air and supplies it to the cabin room 40 through the second line 24.

Accordingly, the cabin room 40 may be cooled by the low temperature air supplied from the air distribution device 30.

Here, the first recirculation line 92 may be closed by the operation of the fourth valve V4, and the second recirculation line 94 may be opened by the operation of the fourth valve V4.

In such a state, the air flowing from the cabin room 40 to the fourth valve V4 through the second line 24 may flow into the air supply device 20 along the opened second recirculation line 94.

The air supplied to the air supply device 20 may be supplied to the air cycle apparatus 100 along the first line 22 together with the ambient air drawn at the air supply device 20.

That is, in the second cooling mode, since the temperature of the cabin room 40 has reached the target temperature, the thermal management system stops the operation of the second heat-exchanger 80 and recirculates the low temperature air to the second recirculation line 94, whereby the load of the entire system may be decreased and the cabin room 40 may be efficiently cooled.

Meanwhile, in the present embodiment, it has been described in an exemplary embodiment that the third bypass line 124 is closed in the first cooling mode and the second cooling mode, but it is not limited thereto. It may be understood that the third bypass line 124 may be opened by the operation of the third valve V3.

When the third bypass line 124 is opened, the air flowing into the third bypass line 124 may flow into the second line 24 by detouring around the expansion part 120, in the state expanded by the operation of the expansion valve 126.

In the present embodiment, the operation in the first heating mode of the vehicle interior is described with reference to FIG. 4.

Figure 4:
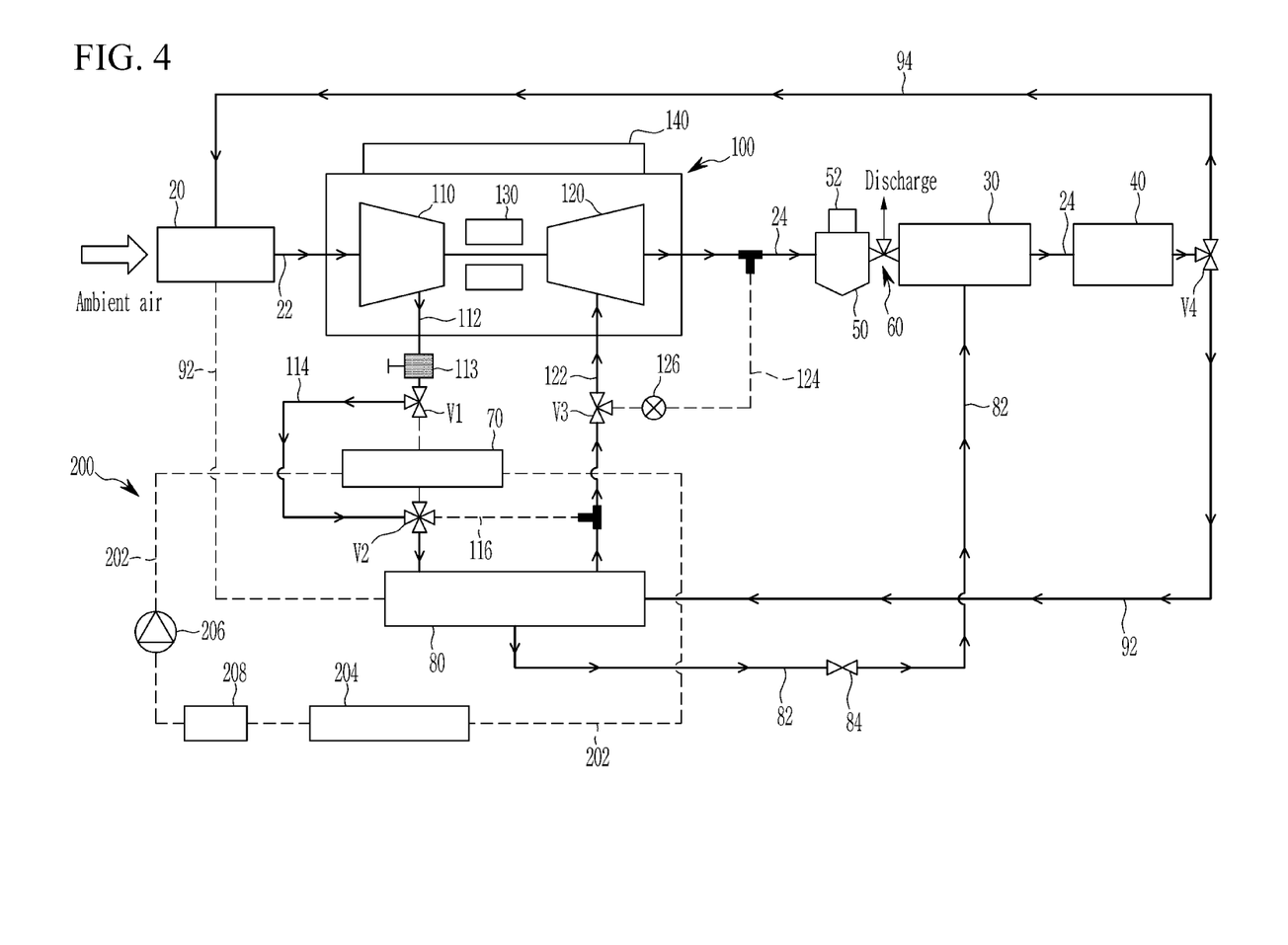
FIG. 4 is an operation diagram of a first heating mode of a thermal management system of a vehicle according to an embodiment.

FIG. 4 is an operation diagram of the first heating mode of a thermal management system of a vehicle according to an embodiment.

Referring to FIG. 4, the air supply device 20 draws the ambient air and supplies the drawn air to the compressing part 110 of the air cycle apparatus 100 through the first line 22.

The compressing part 110 may compress the air supplied from the air supply device 20 by the operation of the driving portion 130 to form the high temperature state.

Here, the first bypass line 114 may be opened by the operation of the first valve V1 and the second valve V2.

In addition, the second bypass line 116 may be closed by the operation of the second valve V2.

In addition, the third bypass line 124 may be closed by the operation of the third valve V3.

Accordingly, the high temperature air compressed at the compressing part 110 flows into the second heat-exchanger 80 along the first connection line 112 and the opened first bypass line 114 without passing through the first heat-exchanger 70.

Here, the operation of the cooling apparatus 200 may be stopped.

Simultaneously, the first recirculation line 92 and the second recirculation line 94 may be respectively opened by the operation of the fourth valve V4.

Here, in the first recirculation line 92, the partial portion of the first recirculation line 92 connected to the air distribution device 30 by passing through the second heat-exchanger 80 may be closed.

Accordingly, a portion of the air discharged from the cabin room 40 may flow into the second heat-exchanger 80 through the opened partial portion of the first recirculation line 92.

In addition, the remaining air of the air discharged from the cabin room 40 may be supplied to the air supply device 20 along the opened second recirculation line 94.

Here, the third line 82 may be opened by an operation of the check valve 84.

Then, the second heat-exchanger 80 may cool the air supplied from the compressing part 110 through heat-exchange with the air introduced through the first recirculation line 92.

That is, since the temperature of the air supplied from the compressing part 110 is very high, the temperature of the second heat-exchanger 80 may be lowered by heat-exchange with the air introduced into the first recirculation line 92.

Accordingly, a portion of the air cooled at the second heat-exchanger 80 may be supplied to the expansion part 120 along the opened second connection line 122.

The expansion part 120 expands the supplied air by the operation of the driving portion 130 to form the low temperature state.

The low temperature air expanded at the expansion part 120 may pass through the dehumidifier 50 along the second line 24. Here, the dehumidifier 50 may remove the moisture included in the air and supply the air with the moisture removed to the control valve 60.

The control valve 60 may externally discharge the low temperature air supplied from the dehumidifier 50 in order to prevent it from flowing into the air distribution device 30.

That is, the control valve 60 externally discharges the low temperature air, thereby preventing the temperature of the air drawn into the air distribution device 30 from being lowered.

Meanwhile, the portion of the air cooled at the second heat-exchanger 80 may directly flow into the air distribution device 30 along the opened third line 82.

The air distribution device 30 distributes air at high temperature supplied from the second heat-exchanger 80 through the third line 82 and supplies it to the cabin room 40 through the second line 24.

Accordingly, the cabin room 40 may be heated by the high temperature air supplied from the air distribution device 30.

In such a state, a portion of the air flowing from the cabin room 40 to the fourth valve V4 through the second line 24 may be supplied to the second heat-exchanger 80 along the opened first recirculation line 92, and the remaining air may flow into the air supply device 20 along the opened second recirculation line 94.

The air supplied to the air supply device 20 through the second recirculation line 94 may be supplied to the air cycle apparatus 100 along the first line 22 together with the ambient air drawn at the air supply device 20.

While repetitively performing the operations, the cabin room 40 may be smoothly heated in the first heating mode by using the ambient air.

That is, in the first heating mode, since the temperature of the cabin room 40 has not reached the target temperature, the thermal management system may prevent the temperature of the air supplied from the compressing part 110 from being excessively lowered by recirculating the relatively high-temperature air to the second heat-exchanger 80 through the first recirculation line 92.

Accordingly, in the first heating mode, the temperature of the cabin room 40 may reach the target temperature by improving operation efficiency by increasing the temperature of the air supplied to the cabin room 40.

In the present embodiment, the operation in the second heating mode of the vehicle interior is described with reference to FIG. 5.

Figure 5:
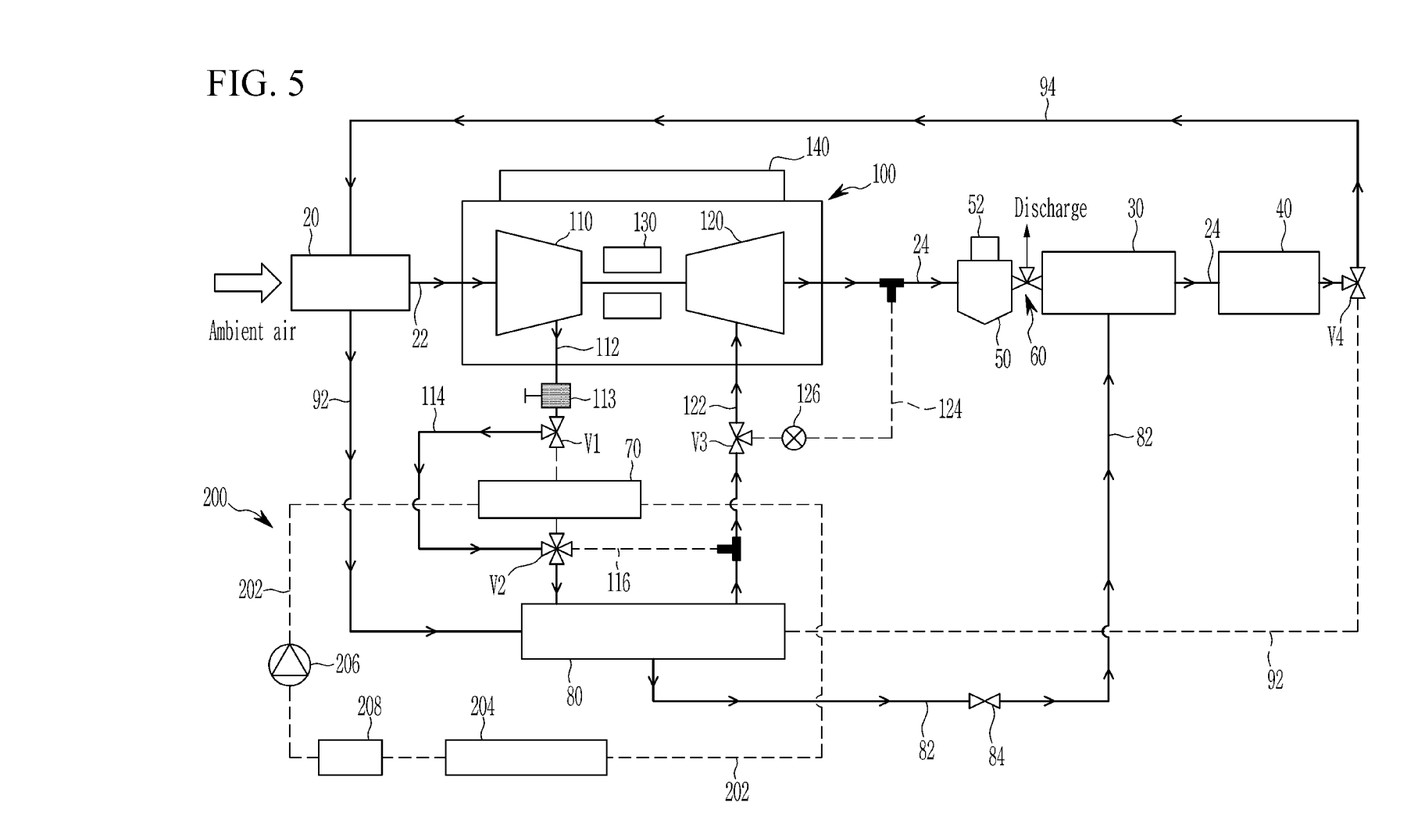
FIG. 5 is an operation diagram of a second heating mode of a thermal management system of a vehicle according to an embodiment.

FIG. 5 is an operation diagram of the second heating mode of a thermal management system of a vehicle according to an embodiment.

Referring to FIG. 5, the air supply device 20 draws the ambient air and supplies the drawn air to the compressing part 110 of the air cycle apparatus 100 through the first line 22.

The compressing part 110 may compress the air supplied from the air supply device 20 by the operation of the driving portion 130 to form the high temperature state.

Here, the first bypass line 114 may be opened by the operation of the first valve V1 and the second valve V2.

In addition, the second bypass line 116 may be closed by the operation of the second valve V2.

In addition, the third bypass line 124 may be closed by the operation of the third valve V3.

Accordingly, the high temperature air compressed at the compressing part 110 flows into the second heat-exchanger 80 along the first connection line 112 and the opened first bypass line 114 without passing through the first heat-exchanger 70.

Here, the operation of the cooling apparatus 200 may be stopped.

Simultaneously, the second recirculation line 94 may be opened by the operation of the fourth valve V4.

In addition, in the first recirculation line 92, the partial portion of the first recirculation line 92 connecting the fourth valve V4 and the second heat-exchanger 80 may be closed by the operation of the fourth valve V4.

In addition, the partial portion of the first recirculation line 92 connecting the air distribution device 30 and the second heat-exchanger 80 may be opened.

Accordingly, the portion of the air discharged from the cabin room 40 may flow into the air supply device 20 through the opened second recirculation line 94.

Here, the air supply device 20 may supply the air to the second heat-exchanger 80 through the opened partial portion of the first recirculation line 92.

Here, the third line 82 may be opened by the operation of the check valve 84.

Then, the second heat-exchanger 80 may cool the air supplied from the compressing part 110 through heat-exchange with the air introduced through the opened portion of the first recirculation line 92.

That is, since the temperature of the air supplied from the compressing part 110 is very high, the temperature of the second heat-exchanger 80 may be lowered by heat-exchange with the air supplied from the air supply device 20 through the opened first recirculation line 92.

Accordingly, the portion of the air cooled at the second heat-exchanger 80 may be supplied to the expansion part 120 along the opened second connection line 122.

The expansion part 120 expands the supplied air by the operation of the driving portion 130 to form the low temperature state.

The low temperature air expanded at the expansion part 120 may pass through the dehumidifier 50 along the second line 24. Here, the dehumidifier 50 may remove the moisture included in the air and supply the air with the moisture removed to the control valve 60.

The control valve 60 may externally discharge the low temperature air supplied from the dehumidifier 50 in order to prevent it from flowing into the air distribution device 30.

That is, the control valve 60 externally discharges the low temperature air, thereby preventing the temperature of the air drawn into the air distribution device 30 from being lowered.

Meanwhile, the portion of the air cooled at the second heat-exchanger 80 may directly flow into the air distribution device 30 along the opened third line 82.

The air distribution device 30 distributes the air at high temperature supplied from the second heat-exchanger 80 through the third line 82 and supplies it to the cabin room 40 through the second line 24.

Accordingly, the cabin room 40 may be heated by the high temperature air supplied from the air distribution device 30.

In such a state, the air flowing from the cabin room 40 to the fourth valve V4 through the second line 24 may flow into the air supply device 20 along the opened second recirculation line 94.

The air supplied to the air supply device 20 through the second recirculation line 94 may be supplied to the air cycle apparatus 100 along the first line 22 together with the ambient air drawn at the air supply device 20.

Here, the air supply device 20 may supply some air to the second heat-exchanger 80 through the first recirculation line 92 and repetitively perform the above-described processes.

While repetitively performing the operations, the cabin room 40 may be smoothly heated in the second heating mode by using the ambient air.

That is, in the second heating mode, since the temperature of the cabin room 40 has reached the target temperature, the thermal management system recirculates relatively low-temperature air from the air supply device 20 to the second heat-exchanger 80, and thereby the temperature of the air supplied from the compressing part 110 may be efficiently lowered.

Accordingly, in the second heating mode, the cabin room 40 may be efficiently heated while reducing the load of the entire system by improving operation efficiency by decreasing the temperature of the air supplied to the cabin room 40.

Meanwhile, in the first heating mode and the second heating mode, it has been described in an exemplary embodiment that the control valve 60 discharges the low temperature air supplied from the expansion part 12 to the outside, but it is not limited thereto.

That is, when the temperature of the cabin room 40 becomes excessively high or dehumidification is required, the control valve 60 may decrease the temperature of the air supplied to the cabin room 40 by supplying the low temperature air to the air distribution device 30.

Therefore, a thermal management system of a vehicle according to an embodiment may become environmentally friendly and may respond to future environmental regulations by performing cooling or heating of the vehicle interior by using the ambient air.

In addition, since the conventionally used refrigerant is removed, the refrigerant injection process may be removed and at the same time, the refrigerant injection equipment becomes unnecessary, and therefore, reduction in the number of manufacturing processes, reduction of overall manufacturing cost, and improvement of productivity may be achieved.

Furthermore, by applying a low-pressure system using the ambient air, quality problems with respect to micro-leaks may be prevented and maintenance costs may be reduced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A thermal management system of a vehicle, the system comprising:
   an air supply device configured to draw and supply air, wherein the air is ambient air;
   an air cycle apparatus comprising a compressor, a turbine, and a motor, connected to the air supply device through a first line, and configured to compress or expand the air supplied from the air supply device to be changed to a high temperature air or a low temperature air;
   an air distribution device connected to the air cycle apparatus through a second line;
   a cabin room connected to the air distribution device through the second line and configured to receive the high temperature air or the low temperature air supplied from the air distribution device through the second line;
   a first heat-exchanger connected to the air cycle apparatus through a first connection line and configured to perform heat-exchange on the high temperature air compressed by and supplied from the air cycle apparatus;
   a second heat-exchanger connected to the first heat-exchanger through the first connection line, connected to the air cycle apparatus through a second connection line, and configured to perform heat-exchange on the air introduced through the first connection line;
   a third line configured to selectively connect the second heat-exchanger and the air distribution device and to selectively supply the air having heat-exchanged while passing through the second heat-exchanger to the air distribution device;
   a first valve on the first connection line between the air cycle apparatus and the first heat-exchanger;
   a second valve on the first connection line between the first heat-exchanger and the second heat-exchanger;
   a first bypass line interconnecting the first valve and the second valve such that the air flowing into the first connection line from the air cycle apparatus may be supplied to the second heat-exchanger by detouring around the first heat-exchanger; and
   a second bypass line interconnecting the second valve and the second connection line between the second heat-exchanger and the air cycle apparatus.

2. The system of claim 1, wherein the air cycle apparatus comprises:
   a compressing part comprising the compressor and configured to compress the air supplied from the air supply device through the first line and to supply the high temperature air to the first heat-exchanger through the first connection line;
   an expansion part comprising the turbine and configured to expand the air supplied from the second heat-exchanger through the second connection line and to supply the low temperature air to the air distribution device through the second line;
   a driving portion comprising the motor, provided between the compressing part and the expansion part and configured to provide driving torque to the compressing part and the expansion part; and
   a controller configured to control an operation of the driving portion.

3. The system of claim 1, further comprising a pressure adjuster on the first connection line between the air cycle apparatus and the first valve.

4. The system of claim 1, further comprising a dehumidifier on the second line between the air cycle apparatus and the air distribution device and configured to remove moisture included in the air flowing along the second line.

5. The system of claim 4, further comprising a control valve between the dehumidifier and the air distribution device, wherein the control valve is configured to supply the air having passed through the dehumidifier to the air distribution device or to externally discharge the air having passed through the dehumidifier.

6. The system of claim 4, further comprising a temperature sensor on the dehumidifier.

7. The system of claim 1, further comprising a fourth valve on the second line at a rear end of the cabin room with reference to an air flow direction.

8. The system of claim 7, further comprising:
   a first recirculation line connecting the fourth valve to the air supply device by passing through the second heat-exchanger; and
   a second recirculation line of which a first end is connected to the fourth valve and a second end is connected to the air supply device such that the air discharged from the cabin room is recirculated to the air supply device.

9. The system of claim 8, wherein the second heat-exchanger comprises an air-cooled heat-exchanger configured to cool the high temperature air introduced through the first connection line by heat-exchange with the ambient air or air introduced through the first recirculation line.

10. The system of claim 1, further comprising a check valve on the third line configured to prevent the air from flowing from the air distribution device to the second heat-exchanger.

11. A thermal management system of a vehicle, the system comprising:
- an air supply device configured to draw and supply air, wherein the air is ambient air;
- an air cycle apparatus comprising a compressor, a turbine, and a motor, connected to the air supply device through a first line, and configured to compress or expand the air supplied from the air supply device to be changed to a high temperature air or a low temperature air;
- an air distribution device connected to the air cycle apparatus through a second line;
- a cabin room connected to the air distribution device through the second line and configured to receive the high temperature air or the low temperature air supplied from the air distribution device through the second line;
- a first heat-exchanger connected to the air cycle apparatus through a first connection line and configured to perform heat-exchange on the high temperature air compressed by and supplied from the air cycle apparatus;
- a second heat-exchanger connected to the first heat-exchanger through the first connection line, connected to the air cycle apparatus through a second connection line, and configured to perform heat-exchange on the air introduced through the first connection line;
- a third valve on the second connection line;
- a third line configured to selectively connect the second heat-exchanger and the air distribution device and to selectively supply the air having heat-exchanged while passing through the second heat-exchanger to the air distribution device
- a third bypass line connected to the third valve such that the air introduced through the second connection line may detour around the turbine; and
- an expansion valve on the third bypass line such that the air flowing into the third bypass line may be selectively expanded.

12. The system of claim 11, wherein:
a first end of the third bypass line is connected to the third valve; and
a second end of the third bypass line is connected to the second line between the air cycle apparatus and the air distribution device.

\* \* \* \* \*